United States Patent
Klatt et al.

(10) Patent No.: US 9,462,541 B2
(45) Date of Patent: Oct. 4, 2016

(54) METHOD FOR ENHANCED ACCESS SELECTION FOR A USER EQUIPMENT IN A CELLULAR TELECOMMUNICATIONS NETWORK, TELECOMMUNICATIONS NETWORK, AND SYSTEM FOR ENHANCED ACCESS SELECTION OF A USER EQUIPMENT

(71) Applicant: DEUTSCHE TELEKOM AG, Bonn (DE)

(72) Inventors: Axel Klatt, Cologne (DE); Claudio Coletti, Prague (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 14/906,905

(22) PCT Filed: Jul. 23, 2014

(86) PCT No.: PCT/EP2014/065820
§ 371 (c)(1),
(2) Date: Jan. 22, 2016

(87) PCT Pub. No.: WO2015/011190
PCT Pub. Date: Jan. 29, 2015

(65) Prior Publication Data
US 2016/0165531 A1    Jun. 9, 2016

(30) Foreign Application Priority Data

Jul. 26, 2013 (EP) .................................... 13003745

(51) Int. Cl.
*H04W 4/00* (2009.01)
*H04W 48/18* (2009.01)
(Continued)

(52) U.S. Cl.
CPC ............ *H04W 48/18* (2013.01); *H04W 76/02* (2013.01); *H04W 36/14* (2013.01); *H04W 48/16* (2013.01); *H04W 84/042* (2013.01); *H04W 84/12* (2013.01)

(58) Field of Classification Search
CPC . H04W 48/18; H04W 76/02; H04W 84/042; H04W 84/12
USPC ...... 455/434, 456.1, 404.1, 554, 414.1, 450, 455/464
See application file for complete search history.

(56) References Cited

U.S. PATENT DOCUMENTS

2007/0207804 A1* 9/2007 Sharma ............. H04L 29/06027
455/436
2009/0170557 A1* 7/2009 Chauhan ............... H04W 36/14
455/552.1

(Continued)

FOREIGN PATENT DOCUMENTS

EP           2437558 A1    4/2012
WO    WO 2011097321 A2   8/2011

OTHER PUBLICATIONS

"Universal Mobile Telecommunications System (UMTS); LTE; Access to the 3GPP Evolved Packet Core (EPC) via non-3GPP access networks; Stage 3 (3GPP TS 24.302 version 11.7.0 Release 11)", Technical Specification, European Telecommunications Standards Institute (ETSI), vol. 3GPP CT 1, No. V11.7.0, Jul. 1, 2013, XP014157040.

(Continued)

Primary Examiner — Joseph Arevalo
(74) Attorney, Agent, or Firm — Leydig, Voit & Mayer, Ltd.

(57) ABSTRACT

A method for enhanced access selection for a user equipment in a cellular telecommunications network includes: in a first step, a serving base station entity sending validation information to the user equipment, the validation information having either a positive value, indicating to apply a policy corresponding to a policy information data element, or a negative value, indicating not to apply the policy corresponding to the policy information data element; and in a second step, subsequent to the first step, the user equipment applying the policy corresponding to the policy information data element in case that the validation information has a positive value, and the user equipment terminating the data bearer or refraining from establishing the data bearer via the access point in case that the validation information has a negative value.

12 Claims, 1 Drawing Sheet

Fig. 1

(51) Int. Cl.
*H04W 76/02* (2009.01)
*H04W 36/14* (2009.01)
*H04W 48/16* (2009.01)
*H04W 84/04* (2009.01)
*H04W 84/12* (2009.01)

(56) References Cited

U.S. PATENT DOCUMENTS

| | | | | |
|---|---|---|---|---|
| 2009/0215438 | A1* | 8/2009 | Mittal | H04M 3/42195 455/418 |
| 2010/0128694 | A1* | 5/2010 | Choi-Grogan | H04W 36/0027 370/331 |
| 2010/0128697 | A1* | 5/2010 | Choi-Grogan | H04W 36/0044 370/332 |
| 2012/0196644 | A1 | 8/2012 | Scherzer et al. | |
| 2012/0220281 | A1* | 8/2012 | Chandan | H04W 8/26 455/418 |
| 2013/0288668 | A1* | 10/2013 | Pragada | H04W 12/06 455/426.1 |
| 2014/0098789 | A1* | 4/2014 | Liu | H04W 76/02 370/331 |

OTHER PUBLICATIONS

"Universal Mobile Telecommunications System (UMTS); LTE; Access Network Discovery and Selection Function (ANDSF) Management Object (MO) (3GPP TS 24.312 version 11.5.0 Release 11)", Technical Specification, European Telecommunications Standards Institute (ETSI), vol. 3GPP CT 1, No. V11.5.0, Jan. 1, 2013, XP014092888.

* cited by examiner

METHOD FOR ENHANCED ACCESS SELECTION FOR A USER EQUIPMENT IN A CELLULAR TELECOMMUNICATIONS NETWORK, TELECOMMUNICATIONS NETWORK, AND SYSTEM FOR ENHANCED ACCESS SELECTION OF A USER EQUIPMENT

CROSS-REFERENCE TO RELATED APPLICATIONS

This application is a U.S. National Phase application under 35 U.S.C. §371 of International Application No. PCT/EP2014/065820, filed on Jul. 23, 2014, and claims benefit to European Patent Application No. EP 13003745.0, filed on Jul. 26, 2013. The International Application was published in English on Jan. 29, 2015 as WO 2015/011190 A1 under PCT Article 21(2).

FIELD

The present invention relates inter alia to a method for enhanced access selection of a user equipment in a cellular telecommunications network, especially a public land mobile network, wherein an access point provides an additional route for establishing a data bearer of a data connection of the user equipment with the telecommunications network instead of using a serving base station entity of the telecommunications network.

Furthermore, the present invention relates to a telecommunications network, especially a public land mobile network, provided for an enhanced access selection of a user equipment camping on the cellular telecommunications network, wherein an access point provides an additional route for establishing a data bearer or a data connection of the user equipment with the telecommunications network instead of using a serving base station entity of the telecommunications network.

Additionally, the present invention relates to a system for enhanced access selection of a user equipment in a cellular telecommunications network, especially a public land mobile network, the system comprising the user equipment, the telecommunications network, and an access point, wherein the access point provides an additional route for establishing a data bearer of a data connection of the user equipment with the telecommunications network instead of using a serving base station entity of the telecommunications network.

BACKGROUND

Operators of cellular telecommunications networks or public land mobile networks use—in addition to base transceiver stations—WLAN Access Points (APs) to establish a data bearer of a data connection with a mobile subscriber or user equipment. To achieve this, access points, especially WLAN (wireless local area network) access points, are deployed as public hot-spots, and they can be directly owned by the operator of the public land mobile network or accessible via roaming agreements with third-parties.

The rules and procedures for connecting user equipments in a cellular telecommunications network to such WLAN access points are especially specified through access policy controls. Presently, e.g., network policies are executed at the user equipment side via a device connection manager (CM) application. Generally, the connection manager handles information about network access policies, discovery of WLAN access points, and user preferences.

To facilitate the integration of WLAN access points into the mobile core network, several standard bodies have investigated different features regarding user equipment network authentication and interworking between cellular and WLAN networks. As for WLAN networks, the Wi-Fi Alliance standard activity "Hotspot 2.0" introduces enhancements in terms of SIM-based user equipment authentication and network discovery of WLAN access points.

In TS 24.302 3GPP defined the access to the Enhanced Packed Core for non-3GPP access to which also WLAN is considered. The 3GPP-standardized Access Network Discovery and Selection Function (ANDSF) specifies in 3GPP TS 24.312 a framework for delivering access network selection policies to user equipments. The policies define network selection rules and connection configurations for access selection, by the user equipment, between using the (cellular) access network of the 3GPP network (or telecommunications network) and non-3GPP access points or networks that do not inherently belong to the 3GPP network, such as WLAN networks or WLAN access points. The policies can be based on user equipment location, time of day, list of available WLAN access points, and IP-flow and multi-network connectivity capabilities.

SUMMARY

In an embodiment, the present invention provides a method for enhanced access selection for a user equipment in a cellular telecommunications network. The cellular telecommunications network comprises an access network. The user equipment is located in a radio cell of the access network and in a radio coverage area of an access point. The radio cell is served by a serving base station entity. The user equipment is registered with the telecommunications network via the serving base station entity. The user equipment comprises or receives a policy information data element, the policy information data element being related to a policy regarding establishment of a data connection, using at least one data bearer, of the user equipment with the telecommunications network via the access point instead of via the serving base station entity. In case that a data bearer between the user equipment and the telecommunications network is to be established or is ongoing, and the policy allows establishment or continuation of the data bearer of the user equipment via the access point instead of via the serving base station entity, the method comprises the following steps: in a first step, the serving base station entity sending validation information to the user equipment, the validation information having either a positive value, indicating to apply the policy corresponding to the policy information data element, or a negative value, indicating not to apply the policy corresponding to the policy information data element; and in a second step, subsequent to the first step, the user equipment applying the policy corresponding to the policy information data element in case that the validation information has a positive value, and the user equipment terminating the data bearer or refraining from establishing the data bearer via the access point in case that the validation information has a negative value.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The main limitation of the features discussed in the Background is that the network selection policies are statically configured at the user equipment side or semi-statically updated via ANDSF, i.e. a considerable overhead is required to change or to update such network selection policies via ANDSF. As the access selection decision is ultimately taken by the user equipment, this can lead to unpredictable user behaviour especially when simplistic and device-dependent CM applications are used. The configured network policies may lead to erroneous decisions under fast-changing user load conditions, which are typical in high-traffic urban areas. Moreover, ANDSF performance is also limited by heavy signalling load and the support for only infrequent changes of the policies.

In an embodiment, the present invention provides a method for enhanced access selection of a user equipment in a cellular telecommunications network that comprises or that is associated to access points such that network overload situations can be reduced and thus costs like capital expenditure (CAPEX) as well as operational expenditure (OPEX) be reduced, and nevertheless the service level of a user of the mobile telecommunications network preserved even during peak time periods or heavy usage of the telecommunications network.

In an embodiment, the present invention provides a method for enhanced access selection of a user equipment in a cellular telecommunications network, especially a public land mobile network,
the telecommunications network comprising an access network and the user equipment being located in a radio cell of the access network, wherein the radio cell is served by a serving base station entity, wherein the user equipment is—additionally to being located in the radio cell—located in a radio coverage area of an access point,
wherein the user equipment is registered with the telecommunications network via the serving base station entity,
wherein the user equipment comprises or receives a policy information data element, the policy information data element being related to a policy regarding the establishment of a data connection, using at least one data bearer, of the user equipment with the telecommunications network, via the access point instead of via the serving base station entity,
wherein in case that
a data bearer between the user equipment and the telecommunications network is to be established or is ongoing, and
the policy allows the establishment or the continuation of the data bearer of the user equipment via the access point instead of via the serving base station entity, the method comprises the following steps:
in a first step, the serving base station entity sending a validation information to the user equipment, the validation information having either a positive value, indicating to apply the policy related with the policy information data element, or a negative value, indicating not to apply the policy related with the policy information data element,
in a second step, subsequent to the first step, the user equipment applying the policy related with the policy information data element in case that the validation information has a positive value, and the user equipment terminating the data bearer or refraining from establishing the data bearer via the access point in case that the validation information has a negative value.

According to the present invention it is thereby advantageously possible, that network resources can be used more efficiently and thus a higher capacity in handling user requests is possible to perform in the telecommunications network.

Embodiments of the present invention advantageously address a method as well as a telecommunications network and a system for steering the connection of mobile broadband users from a cellular telecommunications network or a cellular mobile network, especially a public land mobile network (PMLN), as for example GSM, UMTS, LTE, WiMax, cdma200 etc. onto an access point, especially a Wireless Local Area Network (WLAN) access point (AP), especially if such an access point (especially a WLAN access point) is directly owned by the mobile operator of the cellular telecommunications network or made accessible through a roaming agreement.

According to the present invention, it is advantageously possible to overcome drawbacks of the conventionally known ANDSF methods. With these ANDSF methods, which in principle would also support more advanced network selection procedures and conditions, it is currently not possible according to the standardization documents to exchange information related to the current network load and radio conditions of both the mobile network and WLANs. Likewise, these pieces of information related to the current load and radio conditions of both the mobile network and WLAN networks or access points are also not taken into account for the network selection policies according to the ANDSF methods.

According to the present invention, it is advantageously possible—especially from an operator's perspective—to take more control of the user equipment behaviour when Cellular and WLAN technologies, i.e. the cellular telecommunications network and further (alternative, especially WLAN) access points, co-exist in the same network, i.e. linked or at least assigned to or communicating with the same core network of the telecommunications network. Especially, the conventionally known solutions do not guarantee a network-controlled user equipment behaviour. According to the present invention, it is advantageously possible to provide a tighter interworking between the cellular telecommunications network and WLANs (or (WLAN) access points and their corresponding networks), especially involving radio interface parameters, to enhance user experience through traffic steering (or access network selection) between the cellular telecommunications networks (i.e. the (cellular) access network of the telecommunications network), on the one hand, and public WLAN access points communicating or connected with the telecommunications network, on the other hand, as appropriate and usable information is available at the network operator's side to provide such enhancements of the user service quality as well as the capacity and load control for the operator.

According to the present invention, the telecommunications network (used in the inventive method and comprised in the inventive system) is a cellular telecommunications network, especially a public land mobile network, comprising a (likewise cellular) access network. At least one user equipment (but preferably a plurality and still more preferably a multitude of user equipments) is located in a radio cell of the access network of the telecommunications network and is registered with the telecommunications network via a base station entity, wherein the radio cell is served by the base station entity as the serving base station entity according to the used radio access technology, e.g. a NodeB for a UMTS access network and an eNodeB for an LTE access network. Additionally, an access point, especially a WLAN access point, is located in the radio cell, i.e. there is at least partially an overlap of the radio coverage area of the radio cell and the access point; however, it is possible that the radio coverage area of the radio cell comprises the radio coverage area of the access point completely, or vice versa, it is possible that the radio coverage area of the access point comprises the radio coverage area of the radio cell completely.

According to, e.g., the known ANDSF method, the user equipment comprises (e.g., initially, i.e. by the original equipment manufacturer, or by the network operator on sale) or receives (e.g. via a radio link transmission) a policy information data element such that the policy information data element is related to a policy regarding the establishment of a data connection (comprising typically at least one data bearer)—of the user equipment with the telecommunications network—via the access point instead of via the serving base station entity. According to the present invention, it is possible and preferred that the data connection can comprise a plurality of data bearers and that at least one thereof is routed via the access point instead of via the serving base station entity (typically the one with the least requirements with respect to quality of service). According to the present invention, in such a situation (i.e. where the user equipment has (physically) the possibility to communicate both with the serving base station entity (via a first radio link), and with the access point (via a second radio link)—as the user equipment is located the respective radio coverage zones or areas—and is provided with a policy information data element being related to a policy), in case that a data bearer between the user equipment and the telecommunications network is to be established or is ongoing, and the policy allows the establishment or the continuation of the data bearer of the user equipment via the access point instead of via the serving base station entity, a validation information is provided to the user equipment, the validation information having either a positive value, indicating to apply the policy, or a negative value, indicating not to apply the policy, and, dependent on the value of the validation information, the user equipment is either applying the policy (in case that the validation information has a positive value) or terminating the data bearer (or refraining from establishing the data bearer) via the access point (in case that the validation information has a negative value).

By providing the validation information, it is advantageously possible according to the present invention to switch on or off the application of the policy related with the policy information data element such that a switch (with one data bearer or a plurality of data bearers of a data connection of the user equipment) is either forced, upon a telecommunications network's initiative (i.e. controlled by the serving base station entity serving the user equipment and by means of a positive value of the validation information), towards the access point (in case that, via the policy information data element, the policy is defined accordingly), or such a switch is not performed (i.e. in case of a negative value of the validation information) even though the stored policy, defined by the policy information data element, indicates to switch (in case of physical availability and accessibility) the user equipment (at least with one data bearer) towards the access point.

According to the present invention, it is preferred that the transmission of the validation information from the serving base station entity to the user equipment is independent from the transmission of the policy information data element.

Thereby it is advantageously possible, that, e.g., the policy information data element is transmitted at another time than the validation information. According to one alternative, the policy information data element is transmitted to the user equipment prior to transmitting the validation information (i.e. the policy information data element is transmitted prior to the first step of the inventive method). According to a further alternative, the policy information data element is transmitted after the validation information, i.e. the policy information data element is transmitted after the first step of the inventive method (which means that during the time interval that the user equipment has received the validation information but not yet received the policy information data element, the validation information (whether with a positive or with a negative value) does not change the behavior the user equipment would have had without the transmission of the validation information).

Furthermore, it is preferred according to the present invention that the validation information is transmitted by the serving base station entity to the user equipment using a control channel, preferably a broadcast control channel or a dedicated control channel.

Thereby, it is advantageously possible according to the present invention that the (cellular part of the) telecommunications network, especially the access network of the telecommunications network (of which the serving base station entity is a part) defines how and to which extent the policy as defined by the policy information data element (received by the user equipment) is applied (or not applied) by the user equipment. According to a first scenario, it is advantageously possible according to the present invention that—e.g. in a first network load situation of the telecommunications network and especially of the cellular part (or access network) of the telecommunications network—the validation information is transmitted towards all user equipments within the radio cell being served by the serving base station entity with the validation information having either a positive or negative value such that the application of the policy as defined in the policy information data element is either applied by all those user equipments or not applied by all those user equipments. In such a scenario, a broadcast control channel should be used for transmitting the validation information as this typically leads to less overhead capacity requirements than by using a dedicated control channel to transmit the validation information to all those user equipments within the radio cell being served by the serving base station entity. However, in a second scenario, a finer granularity is preferred for controlling the user equipments, within the radio cell of the serving base station entity, applying or not applying the policy as defined by the policy information data element. For such a situation, the use of a dedicated control channel is preferred according to the present invention. Both manners of transmitting the validation information might also be combined such that, e.g., by using the broadcast control channel, to all user equipments within the radio cell of the serving base station entity, a validation information having the negative value is transmitted, and later on, to only a subset of those user equipments the positive value of the validation information is transmitted using the dedicated control channel. Of course such a combination in using the broadcast control channel and the dedicated control channel can also be used vice versa, i.e. via the broadcast control channel the positive value of the validation information is transmitted (to all user equipments within the radio cell) and for a subset of such user equipments the negative value of the validation information is transmitted using the dedicated control channel.

Still furthermore, it is preferred according to the present invention that in case that
- the data bearer between the user equipment and the telecommunications network is established via the access point, and
- the quality of service of the data bearer is insufficient, the method comprises
- in a fourth step, subsequent to the first step, the user equipment requesting the establishment of the data bearer or requesting or resuming a signaling connection with the telecommunications network via the serving base station entity, and transmitting a failure information to the serving base station entity,
- in a fifth step, subsequent to the fourth step, the serving base station entity sending an access point timer information to the user equipment, the access point timer information being related to a predetermined time interval or indicating a time interval such that the user equipment avoids applying the policy related with the policy information data element during the time interval in case that the validation information transmitted during the first step has a positive value.

Thereby, it is advantageously possible according to the present invention, that a flexible reaction of the user equipment is possible in case that the data transmission conditions with the (WLAN) access point are comparably bad, especially falling below a certain quality of service threshold level. In such a situation, according to the present invention the failure information is transmitted to the serving base station entity which has the consequence that the data bearer (previously served or transmitted through the (WLAN) access point) should be transmitted through the serving base station entity. It is furthermore preferred according to the present invention that an access point timer information is sent from the serving base station entity to the user equipment, indicating that the user equipment avoids applying the policy related with the policy information data element during a certain time interval (irrespective of whether the validation information transmitted during the first step of the inventive method has a positive value or not). The "certain time interval" can either be predetermined, i.e. defined prior to the transmission of the access point timer information, or it can be defined by the access point timer information itself, i.e. the access point timer information is either (only) related to a predetermined time interval or the time interval is defined via the access point timer information.

Furthermore, it is preferred according to the present invention that the user equipment is—additionally to being located in the radio cell—located in a radio coverage area of a further access point, wherein the user equipment comprises or receives a further policy information data element, the further policy information data element being related to a further policy regarding the establishment of a data connection, using at least one further data bearer, of the user equipment with the telecommunications network,—instead of via the serving base station entity—via a further access point and/or a further access point and the access point, wherein the method comprises
- in a third step, prior to the first step or subsequent to the first step, the serving base station entity sending a selection information to the user equipment, the selection information indicating which one of the policy or the further policy should be applied during the second step.

According to this further embodiment of the present invention, it is advantageously possible that a plurality of policies is present within the user equipment, i.e. the policy (defined by the policy information data element) and a further policy (defined by a further policy information data element). The selection information serves to indicate which one or which subset (of a plurality of possible policies) should be applied (or not applied) dependent on the value of the validation information transmitted to the user equipment.

The present invention also relates to a telecommunications network, especially public land mobile network, provided for an enhanced access selection of a user equipment camping on the cellular telecommunications network, the telecommunications network comprising an access network and the user equipment being located in a radio cell of the access network, wherein the radio cell is served by a serving base station entity, wherein the user equipment is—additionally to being located in the radio cell—located in a radio coverage area of an access point,
wherein the user equipment is registered with the telecommunications network via the serving base station entity,
wherein the user equipment comprises or receives a policy information data element, the policy information data element being related to a policy regarding the establishment of a data connection, using at least one data bearer, of the user equipment with the telecommunications network, via the access point instead of via the serving base station entity,
wherein in case that
- a data bearer between the user equipment and the telecommunications network is to be established or is ongoing, and
- the policy allows the establishment or the continuation of the data bearer of the user equipment via the access point instead of via the serving base station entity, the telecommunications network is configured such that
- the serving base station entity sends a validation information to the user equipment, the validation information having either a positive value, indicating to apply the policy related with the policy information data element, or a negative value, indicating not to apply the policy related with the policy information data element, and the validation information steering the user equipment to apply the policy related with the policy information data element in case that the validation information has a positive value, and the validation information steering the user equipment to terminate the data bearer or to refrain from establishing the data bearer via the access point in case that the validation information has a negative value.

Thereby it is advantageously possible according to the present invention to provide a telecommunications network that is able to steer user equipments towards (WLAN) access points that are reachable to user equipments camping on base station entities of the telecommunications network.

According to a further embodiment of the present invention, it is preferred that the telecommunications network is configured such that the validation information is transmitted from the serving base station entity to the user equipment independently from the transmission of the policy information data element.

Furthermore, it is preferred according to the present invention that the telecommunications network is configured such that the validation information is transmitted by the serving base station entity to the user equipment using a control channel, preferably a broadcast control channel or a dedicated control channel.

The present invention also relates to a system for enhanced access selection of a user equipment in a cellular telecommunications network, especially a public land mobile network, the system comprising the user equipment, the telecommunications network, and an access point, the telecommunications network comprising an access network and the user equipment being located in a radio cell of the access network, wherein the radio cell is served by a serving base station entity, wherein the user equipment is—additionally to being located in the radio cell—located in a radio coverage area of an access point, wherein the user equipment is registered with the telecommunications network via the serving base station entity,
wherein the user equipment comprises or receives a policy information data element, the policy information data element being related to a policy regarding the establishment of a data connection, using at least one data bearer, of the user equipment with the telecommunications network, via the access point instead of via the serving base station entity,
wherein in case that
  a data bearer between the user equipment and the telecommunications network is to be established or is ongoing, and
  the policy allows the establishment or the continuation of the data bearer of the user equipment via the access point instead of via the serving base station entity, the system is configured such that
  the serving base station entity sends a validation information to the user equipment, the validation information having either a positive value, indicating to apply the policy related with the policy information data element, or a negative value, indicating not to apply the policy related with the policy information data element,
  the validation information steering the user equipment to apply the policy related with the policy information data element in case that the validation information has a positive value, and the validation information steering the user equipment to terminate the data bearer or to refrain from establishing the data bearer via the access point in case that the validation information has a negative value.

According to a further embodiment of the present invention, in case that
  the data bearer between the user equipment and the telecommunications network is established via the access point, and
  the quality of service of the data bearer is insufficient, the system is configured such that
  the user equipment requests the establishment of the data bearer with the telecommunications network via the serving base station entity, the user equipment transmitting a failure information to the serving base station entity,
  the serving base station entity sends an access point timer information to the user equipment, the access point timer information being related to a predetermined time interval or indicating a time interval such that the user equipment avoids applying the policy related with the policy information data element during the time interval in case that the validation information transmitted has a positive value.

According to yet a further embodiment of the present invention, the user equipment is—additionally to being located in the radio cell—located in a radio coverage area of a further access point, wherein the user equipment comprises or receives a further policy information data element, the further policy information data element being related to a further policy regarding the establishment of a data bearer, of the user equipment with the telecommunications network,—instead of via the serving base station entity—via a further access point and/or a further access point and the access point, wherein the system is configured such that
  the serving base station entity sends a selection information to the user equipment, the selection information indicating which one of the policy or the further policy should be applied.

Furthermore, the present invention relates to a program comprising a computer readable program code which, when executed on a computer or on a network node of a telecommunications network or on an access point or on a user equipment, causes the computer or the network node of the telecommunications network or the access point or the user equipment to perform the inventive method.

The present invention also relates to computer program product for using a core network of a telecommunications network, the computer program product comprising a computer program stored on a storage medium, the computer program comprising program code which, when executed on a computer or on a network node of a telecommunications network or on an access point or on a user equipment, causes the computer or the network node of the telecommunications network or the access point or the user equipment to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
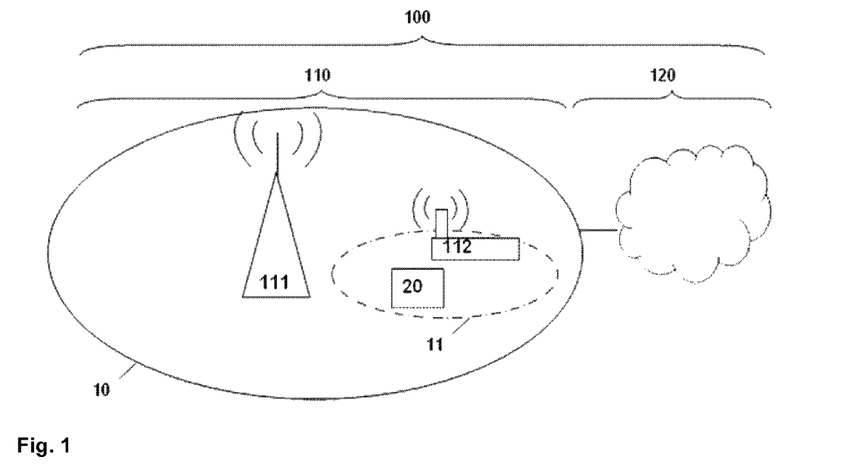
FIG. 1 schematically illustrates a telecommunications network, especially a public land mobile network, which comprises a base station entity (especially a base transceiver station) and a (WLAN) access point. A data connection or at least a data bearer of a data connection of the user equipment can be established either on the base station entity (or base transceiver station) or on the (WLAN) access point.

In FIG. 1, a telecommunications network 100, especially a public land mobile network 100, is schematically shown. The telecommunications network 100 comprises an access network 110 and a core network 120. The telecommunications network 100 is preferably a cellular telecommunications network comprising typically a plurality of network cells, one of which is represented in FIG. 1 by means of a solid circular line having reference sign 10. In the mobile communication network 100, typically a plurality of user equipments are camping on the telecommunications network 100 within the network cell 10, i.e. the user equipments are connected or are camping on a base station entity 111 serving the cell 10, hereinafter also called the serving base station entity 111. The base transceiver station 111 or base station entity 111 is typically a base station, e.g. a BTS (base transceiver station), a NodeB or an eNodeB base transceiver station. Within the area covered by the network cell 10 an access point with reference sign 112 is located. The access point 112 is preferably a WLAN access point. Therefore, in the context of the present invention, the terms WLAN access point or (WLAN) access point or access point are used synonymously. However, it is to be understood that the technology used by the access point is typically but not necessarily a technology of the WLAN type, i.e. a radio network of the IEEE-802.11-family type. The (WLAN) access point 112 is integrated in the telecommunications network 100, i.e. it is coupled or connected to and/or integrated into the core network 120 of the telecommunications network 100. The access point 112 might also be connected directly to the access network 110 of the telecommunications network 100. The radio coverage area of the (WLAN) access point 112 (also called the cell area of the access point 112) is indicated by the circle with reference sign 11, and it is positioned—at least partly—within the network cell 10 (in the example as represented in FIG. 1, it is completely part of the (cellular) radio network cell 10.

In the telecommunications network 100, a user equipment 20 is camping on the telecommunications network 100 within the (cellular) network cell 10. This means that the user equipment 20 connects to the telecommunications network 100 according to the following three possible scenarios:

the user equipment 20 camps on the base transceiver station 111 serving the (cellular) radio cell 10 without transmitting data, i.e. being in idle mode (and not in connected mode with the base station entity 111).

the user equipment 20 establishes a data connection, i.e. at least one data bearer, on the base transceiver station 111 serving the (cellular) radio cell 10.

the user equipment 20 establishes a data connection, i.e. at least one data bearer, with the (WLAN) access point 112 (serving the radio coverage area 11) while the user equipment 20 keeps camping on the base transceiver station 111 serving the cell 10, e.g. in idle mode or in connected mode (but then regarding other data bearers than the at least one data bearer).

The core network 120 is only schematically shown by means of a cloud representation. The telecommunications network (or public land mobile network) 100—d especially the core network 120—comprises typically various network elements such as an MSC (Mobile Switching Center), a SGSN (Serving GPRS Support Node), a MME (Mobility Management Entity), a PDN GW (Packet Data Network Gateway), preferably a plurality of network elements thereof. These network elements are hierarchically higher network elements than the base transceiver station 111 and the WLAN access point 112.

Figure 2:
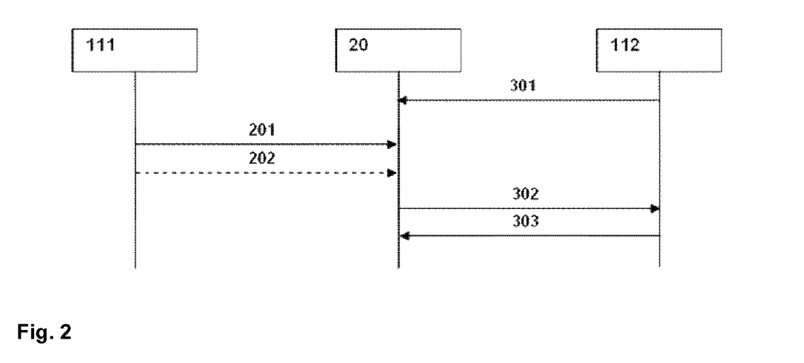
FIGS. 2 and 3 schematically illustrate communication diagrams between a base transceiver station and a user equipment on the one hand, and a WLAN access point and a user equipment on the other hand, according to the present invention.
Figure 3:
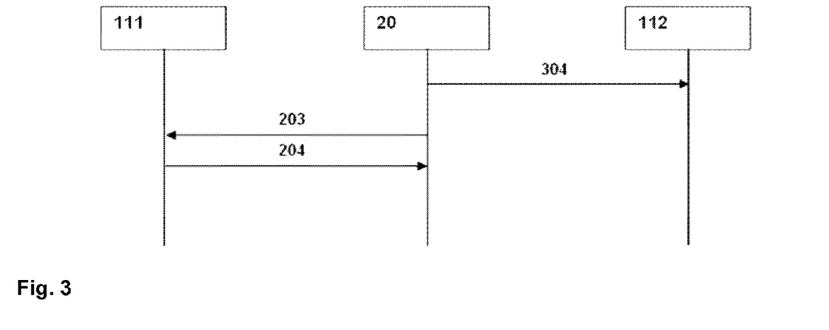

In FIGS. 2 and 3, communication diagrams between the base transceiver station 111 and the user equipment 20 and between the WLAN AP 112 and the user equipment 20 according to the present invention are schematically shown. According to the present invention, the user equipment designated by reference sign 20 is a user equipment that is capable of establishing a data connection with the base transceiver station 111 based on cellular technology or with the WLAN access point 112 based on WLAN technology. Cellular base transceiver stations and WLAN access points 112 transmit on separate frequency channels. When allowed to connect to the (WLAN) access point 112 (by the respective policy defined in a policy information data element received by the user equipment), the user equipment 20 executes higher layer network selection policies with respect to selecting either the cellular network (i.e. the base station entity 111), on the one hand, or the (WLAN) access point 112, on the other hand. The (WLAN) access point 112 is typically either owned by the cellular network operator or owned by another entity or person (than the network operator of the telecommunications network 100) but assigned to be (permanently or temporarily) used with the telecommunications network 100. The policies can be user equipment-specific, or pre-configured in the user equipment 20 via a device connection manager application, or semi-statically obtained through, e.g., the 3GPP ANDSF entity (that is typically included in the core network 120). The policies define the set of rules (e.g. load and radio conditions, service agreements, etc.) by which the user equipment 20 shall abide. It can be assumed that the user equipment 20 be configured with multiple higher layer network selection policies. These can be chosen depending on network conditions or pre-configured by the mobile operator. According to the present invention, the policy regarding the establishment of a data connection, using at least one data bearer, of the user equipment 20 with the telecommunications network 100 is defined by at least one policy information data element.

The premise is that the user equipment 20 is camping on the base station entity 111 (while being in idle mode) or connected to the base station entity 111 (i.e. in connected mode) for data transmission (i.e. with at least one data bearer) to the radio cell 10 served by the base transceiver station 111. The base transceiver station 111 is a controlling base station of any cellular radio technology. The purpose of the base transceiver station 111 (or base station) (and optionally the connected network elements of the core network 120) is to authenticate the user equipment 20 (or the corresponding subscriber). The base transceiver station 111 furthermore controls the channel allocation (i.e. which radio resources shall be used by the user equipment; in this respect, the radio technology, frequency, time slot, transmission code, etc. are defined and allocated by the base transceiver station 111). In a similar fashion, the WLAN access point 112 is operated as transceiver station (e.g. operator-owned but alternatively also owned by another entity or person), i.e. the WLAN access point 112 authenticates the user equipment 20 via the core network 120 and then establishes a data connection, i.e. establishes at least one data bearer) with the user equipment 20. According to the present invention, authentication and network discovery procedures can, e.g., follow the ones specified by the standardization activity "Hotspot 2.0".

The present invention is focused on a method for controlling the access selection of the user equipments (exemplarily shown for the case of the user equipment 20 depicted in FIG. 1) within the radio cell 10, especially steering the data connection of the user equipment 10 from the base station transceiver 111 to the WLAN access point 112 and vice versa (or at least steering one or a plurality of data bearers (as parts of the data connection) from the base station transceiver 111 to the WLAN access point 112 and vice versa). A feature of the invention is that the telecommunications network 100, i.e. the cellular network, controls the execution of the network selection policies through cellular network control signaling.

The invention especially relates to the following two embodiments or application scenarios: The first application scenario addresses the network-controlled procedure to steer user equipment 20 towards the WLAN access point 112, and it is illustrated in FIG. 2. The second application scenario deals with the procedure related to moving the data connection (or at least one or a plurality of data bearers of the data connection) of the user equipment 20 back to the cellular network (i.e. via the base station entity 111) from the WLAN access point, illustrated in FIG. 3. For the sake of simplicity, the method is explained by considering solely one user equipment 20, i.e. the user equipment 20. However, the method can be applied to all user equipments 20 satisfying the same assumptions as those considered for the user equipment 20.

In FIG. 2, information exchange occurs between the user equipment 20 and the base transceiver station 111, and between the user equipment 20 and the WLAN access point 112. Initially, the user equipment 20 is camping on the base station entity 111 or is connected to the base station entity 111 (or base transceiver station 111). Further, the user equipment 20 intends to transmit or receive data from the access network 110. When the user equipment 20 enters into the cell area 11 (or radio coverage area 11) covered by the WLAN access point 112, the user equipment 20 listens to the beacon message 301 (i.e. receives the radio signal of the beacon message 301) transmitted by the WLAN access point 112. By decoding the beacon message 301 the user equipment 20 recognizes the WLAN access point 112 as being a possible access point 112 (as indicated by the policy defined by the policy information data element), i.e. an access point 112 eligible for establishing a data connection (or data bearers). The access point 112 can especially be an operator-owned access point 112. After discovering the WLAN access point 112, the user equipment 20 listens to (i.e. receives the radio signals of) either the broadcast control channel or the dedicated control channel transmitted by the serving base transceiver station 111 via transmission message 201.

As a part of the broadcast channel or dedicated control channel transmission 201, a validation information, especially an additional information bit denoted, e.g., as High-Pol_Trigger, is transmitted from the base station entity 111 to the user equipment 20. The validation information (or HighPol_Trigger bit) influences the behaviour of the user equipment 20 as follows:

If the validation information (or HighPol_Trigger bit) equals to 1 (or "true" or has a positive value), the user equipment 20 shall execute the higher layer network selection policies with respect to establishing a data connection (or a data bearer) with the WLAN access point 112 if the validation information (or HighPol_Trigger bit) equals to 0 (or "false" or has a negative value), the user equipment 20 shall not connect execute the higher layer network selection policies, i.e. shall not connect to the WLAN access point 112 and will keep being connected to the base transceiver station 111, unless the validation information (or HighPol_Trigger bit) state (or value) changes.

In case multiple network selection policies (via multiple policy information data elements) are available at the user equipment 20 (i.e. besides the policy (defined by the policy information data element) a further policy (defined by a further policy information data element), a selection information (or optional information bits Sel_HighPol) is transmitted via a broadcast control channel transmission 202 (for all user equipments 20 within the radio cell) or dedicated control channel transmission 202 (for specific user equipments 20 within the radio cell), indicating which one amongst the higher network selection policies (the policy or the further policy) shall be selected and applied as controlled by the value of the validation information. For instance, four network selection policies can be mapped into 2 bits of the selection information. As shown in FIG. 2, if the selected policy commands the user equipment 20 to switch to the WLAN access point 112, the user equipment 20 sends its authentication request 302 to the WLAN access point 112, which in return sends the acknowledgement 303. After this, the user equipment 112 is connected to WLAN access point 112 and able to transmit and to receive data while still camping on the cellular base transceiver station 111 in idle mode (without any data transmission or with another data bearer active with the base station entity 111).

The selection information is preferably sent on the broadcast control channel of an E-UTRAN cell using the System Information Broadcast Block 3 (SIB3) or System Information Broadcast Block 6 (SIB6). Alternatively, the validation information (or the policy trigger information) is sent on the broadcast control channel of an E-UTRAN cell using a dedicated System Information Broadcast Block, further alternatively the validation information is sent to individual terminals using a dedicated control channel.

According to another embodiment or application scenario of the present invention (which can be combined with the above mentioned embodiment or application scenario), multiple trigger indications can be sent on the broadcast channel. In this case the first indication is only be valid for a group of terminal equipments which were associated with the first group of terminals, the second indication would only valid for a group of terminal equipments which were associated with the second group of terminals, and so on.

The present invention additionally also refers to the situation in which the user equipment 20 has already established a data connection with the WLAN access point 112 and intends to switch back to the telecommunications network 100 via the cellular access network or base station entity 111. As previously stated, the user equipment 20 is at the same time (while exchanging data with the access point 112) camping on the cellular base transceiver station 111 without having any data transmission (idle mode) with the base station entity 111 (or with only a data transmission regarding another data bearer).

In case the WLAN data connection performance does not meet the quality of service requirements (i.e. the quality of service of the data bearer used with the access point 112 is insufficient), the user equipment 20 releases its connection to the WLAN access point 112 via a dissociation frame message 304 represented in FIG. 3.

Then, the user equipment 20 establishes a data connection to the cellular base transceiver station 111, shifting from idle to connected mode. To achieve this, the user equipment 20 needs to send a connection set-up message 203 to the base transceiver station 111. In this message or a subsequent message, a failure information, especially an additional field denoted, e.g., as WLAN_Failure, is introduced so that the user equipment 20 can signal to the telecommunications network 100 (and especially to the base station entity 111) that the previous data connection to the WLAN access point 112 has not been or is no longer successful.

If the failure information (or WLAN_Failure) is reported in the connection set-up message 203 or a subsequent message, the cellular base transceiver station 111 sends back the connection response 204 to user equipment 20, i.e. via dedicated signaling.

Preferably according to the present invention, the connection response 204 includes an access point timer information, i.e. an additional field, denoted, e.g., as WLAN_Timer, which prevents the user equipment 20 from executing higher layer network selection policies for a period of time that is specified in the access point timer information (or WLAN_Timer) despite the validation information (or the indication "HighPol_Trigger") is still set to "true" (or has a positive value) for the respective terminal equipment 20.

Alternatively the connection response 204 containing the access point timer information can always been transmitted from the cellular base transceiver station 111 to the use equipment 20, even without prior reception of the failure information (or WLAN_Failure) from the user equipment 20.

Finally triggers for the cellular base transceiver station 111 to send a connection response 204 to the use equipment 20 which include the access point timer information can be internal base transceiver station 111 triggers or being triggered from any other different entity in the telecommunications network 100.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced access selection for a user equipment in a cellular telecommunications network,
   wherein the cellular telecommunications network comprises an access network;
   wherein the user equipment is located in a radio cell of the access network and in a radio coverage area of an access point,
   wherein the radio cell is served by a serving base station entity,
   wherein the user equipment is registered with the telecommunications network via the serving base station entity,
   wherein the user equipment comprises or receives a policy information data element, the policy information data element being related to a policy regarding establishment of a data connection, using at least one data bearer, of the user equipment with the telecommunications network via the access point instead of via the serving base station entity,
   wherein in case that a data bearer between the user equipment and the telecommunications network is to be established or is ongoing, and the policy allows establishment or continuation of the data bearer of the user equipment via the access point instead of via the serving base station entity, the method comprises the following, steps:
   in a first step, the serving base station entity sending validation information to the user equipment, the validation information having either a positive value, indicating to apply the policy corresponding to the policy information data element, or a negative value, indicating not to apply the policy corresponding to the policy information data element; and
   in a second step, subsequent to the first step, the user equipment applying the policy corresponding to the policy information data element in case that the validation information has a positive value, and the user equipment terminating the data bearer or refraining from establishing the data bearer via the access point in case that the validation information has a negative value.

2. The method according to claim 1, wherein sending the validation information from the serving base station entity to the user equipment is independent from the user equipment receiving the policy information data element.

3. The method according to claim 1, wherein the validation information is sent by the serving base station entity to the user equipment using a control channel.

4. The method according to claim 1, wherein in case that the data bearer between the user equipment and the telecommunications network is established via the access point, and the quality of service of the data bearer is insufficient, the method further comprises in a fourth step, subsequent to the first step, the user equipment requesting the establishment of the data bearer or requesting or resuming a signaling connection with the telecommunications network via the serving base station entity, and transmitting failure information to the serving base station entity; and in a fifth step, subsequent to the fourth step, the serving base station entity sending an access point timer information to the user equipment, the access point timer information being related to a predetermined time interval or indicating a time interval such that the user equipment avoids applying the policy corresponding to the policy information data element during the time interval in case that the validation information transmitted during the first step has a positive value.

5. The method according to claim 1, wherein the user equipment is located in a radio coverage area of a further access point, wherein the user equipment comprises or receives a further policy information data element, the further policy information data element being related to a further policy regarding establishment of a data connection, using at least one further data bearer, of the user equipment with the telecommunications network via a further access point or a further access point and the access point, wherein the method further comprises:

in a third step, prior to the first step or subsequent to the first step, the serving base station entity sending selection information to the user equipment, the selection information indicating whether the policy or the further policy should be applied during the second step.

6. A telecommunications network provided for an enhanced access selection for a user equipment camping on the cellular telecommunications network, the telecommunications network comprising:

an access network, with the user equipment being located in a radio cell of the access network;

wherein the radio cell is served by a serving base station entity;

wherein the user equipment is located in a radio coverage area of an access point;

wherein the user equipment is registered with the telecommunications network via the serving base station entity;

wherein the user equipment comprises or is configured to receive a policy information data element, the policy information data element being related to a policy regarding establishment of a data connection, using at least one data bearer, of the user equipment with the telecommunications network via the access point instead of via the serving base station entity;

wherein in case that a data bearer between the user equipment and the telecommunications network is to be established or is ongoing, and the policy allows establishment or continuation of the data bearer of the user equipment via the access point instead of via the base station entity, the telecommunications network is configured such that:

the serving base station entity sends validation information to the user equipment, the validation information having either a positive value, indicating to apply the policy corresponding to the policy information data element, or a negative value, indicating not to apply the policy corresponding to the policy information data element; and the validation information steers the user equipment to apply the policy corresponding to the policy information data element in case that the validation information has a positive value, and the validation information steers the user equipment to terminate the data bearer or to refrain from establishing the data bearer via the access point in case that the validation information has a negative value.

7. The telecommunications network according to claim 6, wherein the telecommunications network is configured such that the validation information is sent from the serving base station entity to the user equipment independently from the user equipment receiving the policy information data element.

8. The telecommunications network according to claim 6, wherein the telecommunications network is configured such that the validation information is sent by the base station entity to the user equipment using a control channel.

9. A system for enhanced access selection for a user equipment in a cellular telecommunications network, the system comprising:

the user equipment;

the telecommunications network; and an access point(112);

wherein the telecommunications network comprises an access network;

wherein the user equipment is located in a radio cell of the access network;

wherein the radio cell is served by a serving base station entity;

wherein the user equipment is located in a radio coverage area of an access point;

wherein the user equipment is registered with the telecommunications network via the serving base station entity;

wherein the user equipment comprises or is configured to receive a policy information data element, the policy information data element being related to a policy regarding establishment of a data connection, using at least one data bearer, of the user equipment with the telecommunications network via the access point instead of via the serving base station entity;

wherein in case that a data bearer between the user equipment and the telecommunications network is to be established or is ongoing, and the policy allows establishment or continuation of the data bearer of the user equipment via the access point instead of via the serving base station entity, the system is configured such that:

the serving base station entity sends validation information to the user equipment, the validation information having either a positive value, indicating to apply the policy corresponding to the policy information data element, or a negative value, indicating not to apply the policy corresponding to the policy information data element; and the validation information steers the user equipment to apply the policy corresponding to the policy information data element in case that the validation information has a positive value, and the validation information steers the user equipment to terminate the data bearer or to refrain from establishing the data bearer via the access point in case that the validation information has a negative value.

10. The system according to claim 9, wherein in case that the data bearer between the user equipment and the telecommunications network is established via the access point, and the quality of service of the data bearer is insufficient, the system is configured such that:

the user equipment requests the establishment of the data bearer with the telecommunications network via the serving base station entity, the user equipment transmitting failure information to the serving base station entity; and the serving base station entity sends access point timer information to the user equipment, the access point timer information being related to a predetermined time interval or indicating a time interval such that the user equipment avoids applying the policy corresponding to the policy information data element during the time interval in case that the validation information transmitted has a positive value.

11. The system according to claim 9, wherein the user equipment is located in a radio coverage area of a further access point, wherein the user equipment comprises or is configured to receive a further policy information data element, the further policy information data element being related to a further policy regarding establishment of a data bearer of the user equipment with the telecommunications network via a further access point and/or a further access point and the access point, wherein the system is configured such that:

the serving base station entity sends selection information to the user equipment, the selection information indicating whether the policy or the further policy should be applied.

12. One or more non-transitory computer readable media having processor-executable instructions stored thereon for enhanced access selection for a user equipment in a cellular telecommunications network, wherein the cellular telecommunications network comprises an access network;

wherein the user equipment is located in a radio cell of the access network and in a radio coverage area of an access point, wherein the radio cell is served by a serving base station entity, wherein the user equipment is registered with the telecommunications network via the serving base station entity, wherein the user equipment comprises or receives a policy information data element, the policy information data element being related to a policy regarding establishment of a data connection, using at least one data bearer, of the user equipment with the telecommunications network via the access point instead of via the serving base station entity, wherein in case that a data bearer between the user equipment and the telecommunications network is to be established or is ongoing, and the policy allows establishment or continuation of the data bearer of the user equipment via the access point instead of via the serving base station entity, the processor-executable instructions, when executed, facilitate performance of the following steps:

in a first step, the serving base station entity sending validation information to the user equipment, the validation information having either a positive value, indicating to apply the policy corresponding to the policy information data element, or a negative value, indicating not to apply the policy corresponding to the policy information data element; and in a second step, subsequent to the first step, the user equipment applying the policy corresponding to the policy information data element in case that the validation information has a positive value, and the user equipment terminating the data bearer or refraining from establishing the data bearer via the access point in case that the validation information has a negative value.

* * * * *